(12) United States Patent
Jung et al.

(10) Patent No.: US 8,397,711 B2
(45) Date of Patent: Mar. 19, 2013

(54) SOLAR COLLECTOR

(75) Inventors: Robert Jung, Los-Fayos (ES); Javier Otano, Bajo C Tudela (ES); Jürgen Weigel, Steffenberg-Oberhorlen (DE); Michael Schröder, Dautphetal (DE)

(73) Assignee: Global Plastic, S.A., Tudela (Navarra) (ES)

( * ) Notice: Subject to any disclaimer, the term of this patent is extended or adjusted under 35 U.S.C. 154(b) by 665 days.

(21) Appl. No.: 11/799,746

(22) Filed: May 2, 2007

(65) Prior Publication Data

US 2007/0283950 A1 Dec. 13, 2007

(30) Foreign Application Priority Data

May 3, 2006 (EP) .................................... 06009218

(51) Int. Cl.
*F24J 2/24* (2006.01)

(52) U.S. Cl. ........ 126/663; 126/624; 126/625; 126/669; 126/673; 126/626; 126/664; 126/665; 285/3; 285/4; 285/901

(58) Field of Classification Search .......... 126/624–626, 126/663–665, 669, 673; 285/3, 4, 901
See application file for complete search history.

(56) References Cited

U.S. PATENT DOCUMENTS

| 4,165,036 | A |   | 8/1979  | Meckler ........................ 237/1    |
|-----------|----|---|---------|------------------------------------------|
| 4,213,449 | A | * | 7/1980  | Roth et al. .................... 126/660 |
| 4,265,220 | A | * | 5/1981  | McAlister ..................... 126/610  |
| 4,292,956 | A | * | 10/1981 | Wasserman .................... 126/651   |
| 4,296,740 | A |   | 10/1981 | Meckler ........................ 126/448 |
| 4,619,801 | A | * | 10/1986 | Engel ............................ 264/146 |
| 4,951,326 | A | * | 8/1990  | Barnes et al. ................... 4/494  |
| 5,431,148 | A | * | 7/1995  | Kronberg ...................... 126/564  |
| 5,629,721 | A |   | 5/1997  | Kirk ............................. 345/123 |
| 7,604,003 | B2 | * | 10/2009 | Merrett ........................ 126/563  |
| 2003/0127089 | A1 | * | 7/2003 | Drummond et al. .......... 126/638 |

FOREIGN PATENT DOCUMENTS

| DE | 3013199   | 10/1980 |
| DE | 3022666   | 1/1982  |
| DE | 29811015  | 10/1998 |
| EP | 1398582   | 3/2004  |
| JP | 56108054  | 8/1981  |

* cited by examiner

*Primary Examiner* — Avinash Savani
(74) *Attorney, Agent, or Firm* — Andrew Wilford

(57) ABSTRACT

A solar collector has a polygonal top panel forming a top face and having at least three edges, a similarly polygonal bottom panel forming a bottom face directed away from the top face and fitted congruently to the top panel to form a flow passage extending between the faces, and at least four connectors projecting from at least three of the edges.

12 Claims, 2 Drawing Sheets

SOLAR COLLECTOR

FIELD OF THE INVENTION

The present invention relates to a solar collector. More particularly this invention concerns such a collector through which a heat-transfer fluid is passed.

BACKGROUND OF THE INVENTION

A standard solar collector has an absorber surface on both the top and bottom faces with a flow passage for a heat-transfer medium between the absorber surfaces. A plurality of connecting pieces or nipples are provided on edges of the absorber unit. As a rule, several such solar collectors are connected together to form a solar-collector field. For this purpose the solar collectors are connected to one another via their connectors to form the solar collector fields, either in parallel or in series. For a connection in series, the heat-transfer medium flows through the interconnected solar collectors one after the other. The heat-transfer medium is normally water, which as a rule flows over the entire surfaces of the two panels forming the flat solar collectors.

In practice, the solar collectors described above are known in various embodiments. Each solar collector usually has two connectors, each being provided for the intake or output of the heat-transfer medium. The two connectors are positioned either on one side of the solar collector or at diagonally opposite corners of the solar collector. Limits are imposed on these solar collectors with regard to their interconnection to form collector fields. Only specific configurations or connections of solar collectors are possible, or long paths must disadvantageously be provided between the solar collectors. As a result, the effectiveness of the heat transfer in solar collector fields leaves much to be desired for the known solar collectors. In the known solar collectors, a vent is frequently provided in an output line to the solar collector. The operational reliability of the ventilation often leaves much to be desired.

OBJECTS OF THE INVENTION

It is therefore an object of the present invention to provide an improved solar collector.

Another object is the provision of such an improved solar collector that overcomes the above-given disadvantages, in particular that is characterized by flexibility and variability with regard to its connection possibilities, and which still ensures operationally reliable and effective heat transfer.

SUMMARY OF THE INVENTION

A solar collector has according to the invention a polygonal top panel forming a top face and having at least three edges, a similarly polygonal bottom panel forming a bottom face directed away from the top face and fitted congruently to the top panel to form a flow passage extending between the faces, and at least four connectors projecting from at least three of the edges.

The connector according to the invention is a fitting by means of which an additional solar collector of a solar collector field may be connected. However, in no event is it mandatory that a connection be made to a solar collector according to the invention, or in particular that a connection be made to a further solar collector, via each of the connectors. This will be further described below. It is practical for the heat-transfer medium to flow over the entire surface of the solar collector according to the invention. The heat-transfer medium is advantageously a fluid medium, preferably water or a water-glycol mixture. However, air may also be used as a heat-transfer medium.

Within the scope of the invention, with the exception of the open or used connectors a solar collector has a design that is closed at the edges. Within the scope of the invention, provision of a connector on an edge means that the connector, i.e. the longitudinal axis of the connector, extends transverse to the edge it is mounted on, preferably perpendicular or substantially perpendicular to this edge. It is also within the scope of the invention that the distance between the absorber surface on the top face and the absorber surface on the bottom face is small compared to the size of these absorber surfaces.

One particularly preferred embodiment of the invention is characterized in that the at least four connectors are distributed on four edges of the absorber unit, in particular on four rectangular side edges of a rectangular absorber unit. The absorber unit preferably has a rectangular shape, specifically having a rectangular top face and a rectangular bottom face. It is practical for the at least four connectors to be provided at the corners or in the region of the corners of the rectangular absorber unit.

One very preferred embodiment of the invention is characterized in that two connectors are provided on each of the four edges of the absorber unit, in particular at each of the four rectangular side edges of a rectangular absorber unit. It is particularly preferred within the scope of the invention that the at least eight connectors be provided at the corners or in the region of the corners of the absorber unit, in particular at the four corners or in the region of the four corners of the rectangular absorber unit. According to a very preferred embodiment of the invention, at least two connectors are provided at each corner of the absorber unit, the two connectors provided at each corner preferably being oriented perpendicular to each other. Within the scope of the invention, "connectors oriented transverse to one another" means in particular that the longitudinal axes of these connectors are oriented transverse to one another and are preferably oriented perpendicular or substantially perpendicular to one another. When two connectors are provided at one corner of the absorber unit, it is preferred that each of these two connectors is provided on a respective one of the edges that meet at this corner.

According to one embodiment of the invention, for a "virgin" solar collector, i.e. not yet attached in a connection, at least a portion of the connectors are closed. Initially closed connectors are obtained in particular when the solar collector according to the invention is manufactured as a plastic part by blowing or blow molding. As a result of this manufacturing process a virgin solar collector may be produced in which several connectors, for example two connectors, are open and the remainder of the connectors are closed. Initially closed connectors may be opened by removing their end face or end wall, if necessary. Unneeded connectors may advantageously be closed or reclosed after or during connection of the solar collector. These unneeded connectors are preferably closed by means of blind plugs. However, an unneeded connector may also be closed by integration of a functional device, which will be further described below.

Within the scope of the invention, at least one input element for the heat-transfer medium and at least one output element for the heat-transfer medium are connected to the connectors. Advantageously, an input line for the heat-transfer medium is connected to one connector for the solar collector according to the invention, and an output line for the heat-transfer medium is connected to a second connector for this solar collector. The remaining connectors may then remain closed or be plugged or capped. In principle, however, it is within the scope of the invention, for example, to connect one input line to two connectors provided on one edge of the solar collector, and to connect one output line to two connectors provided on an opposite edge of the solar collector. In this case as well, the remaining connectors may advantageously be closed using the above-mentioned blind stoppers, for example. When several collectors are connected together to form a field, their connectors can be connected together by short connection nipples.

As indicated above, the unneeded connectors may also be provided with a closure in which a functional device is integrated. Thus, according to one preferred embodiment a vent may be connected to at least one connector for the solar collector. Venting through such a device thus connected to a connector is possible in a particularly operationally reliable manner. In this embodiment the vent thus corresponds to the functional device referenced above.

According to one preferred embodiment of the invention, as a functional device a temperature sensor is connected to at least one connector. In the solar collectors known from the prior art, a temperature sensor is frequently provided in the output line and/or in the input line. Providing a temperature sensor on a connector for the solar collector according to the invention has proven to be particularly satisfactory. The unneeded connectors for the solar collector according to the invention may thus be advantageously used for a closure by means of functional devices.

According to one very preferred embodiment of the invention, the solar collector is made of plastic, or substantially of plastic. The solar collector is preferably manufactured by blow molding. In principle, a solar collector according to the invention could also be made of metal.

The invention is based on the discovery that a solar collector according to the invention is characterized by flexibility and variability with regard to the possibilities for connection to collector fields. In principle, any conceivable collector field connection is possible using the solar collectors according to the invention. This possibility according to the invention results from the plurality of connectors or from the configuration of this plurality of connectors. The solar collectors according to the invention may be easily integrated into a series connection. In such a series connection the solar collectors are connected one after the other, and the heat-transfer medium flows through same in succession. The solar collectors according to the invention may also be easily connected in parallel in a number of possible configurations. Thus, by use of the solar collectors according to the invention various series and parallel connections may be implemented in a simple and unconstrained manner, and the solar collectors may be easily configured, in particular vertically or horizontally. The invention is also based on the discovery that unneeded connectors for the solar collector according to the invention may be easily sealed. Of particular importance are the embodiments in which the unneeded connectors are closed by use of an integrated functional device (in particular a ventilation device or temperature sensor). The functional devices may be used on the connectors in a particularly effective and operationally reliable manner. A solar collector according to the invention may be manufactured relatively simply and economically, in particular in the form of a plastic part, and preferably in a blow-molding process. In the manufacture of a solar collector according to the invention by blow molding, a portion of the connectors for the virgin absorber unit are manufactured closed, and initially closed connectors may be easily opened if necessary, e.g. by cutting off an integral cap or drilling out an integral plug. The solar collectors according to the invention are particularly suited for heating swimming pools, open spas, and the like.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
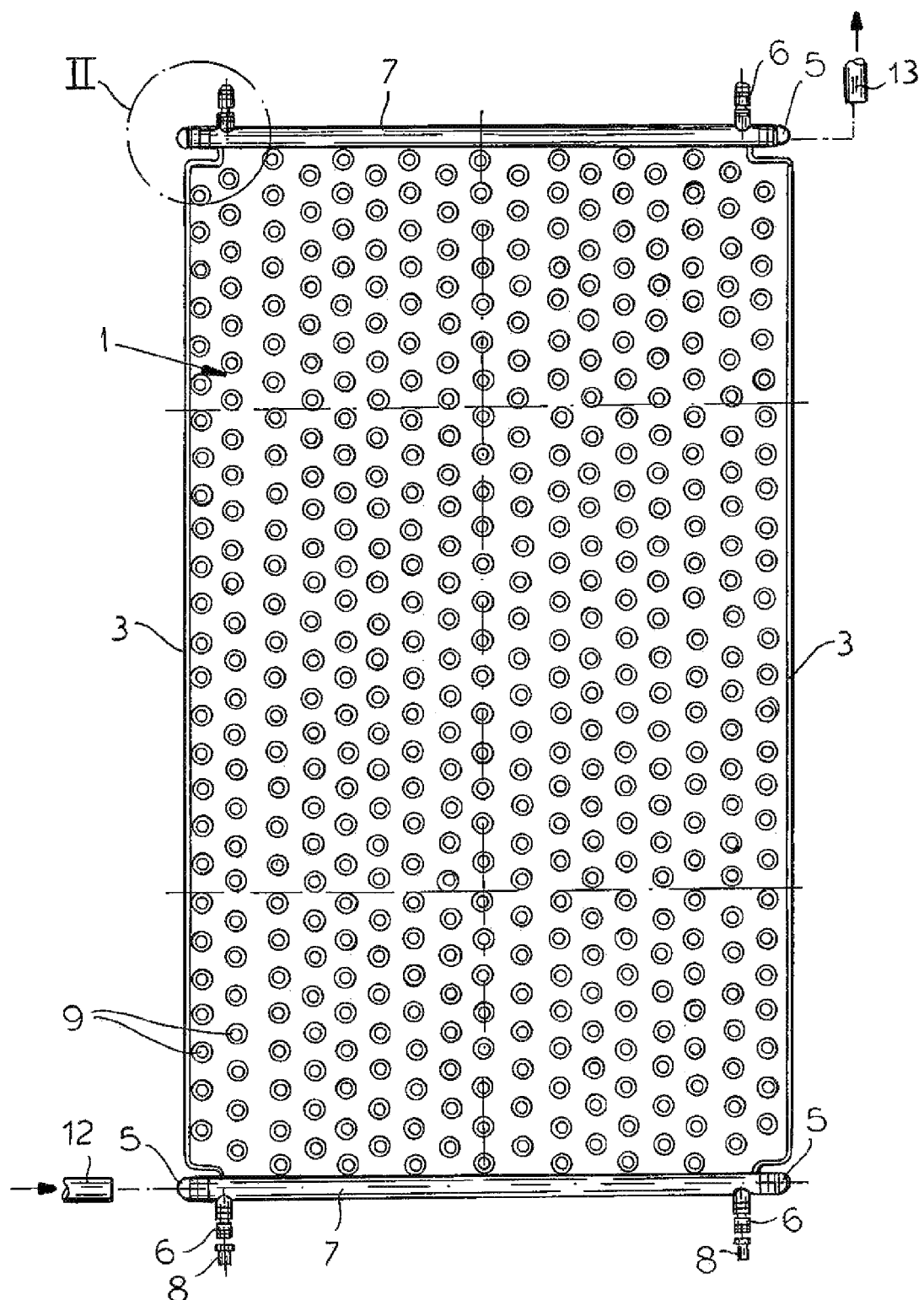
FIG. 1 is a top view of a solar collector according to the invention.

As seen in FIG. 1 a solar collector according to the invention has an absorber surface 1 on the top face and an absorber surface 2 on the bottom face. Preferably and in the illustrated embodiment, the solar collector according to the invention has an elongated rectangular shape as viewed from the top. The top-side absorber surface 1 and the bottom-side absorber surface 2 are connected at the edges by means of short perpendicular edge or side walls 3. The absorber surfaces 1 and 2 form a flow passage 4 for a heat-transfer medium, e.g. water. The absorber surfaces 1 and 2 are usually colored black.

In the illustrated embodiment connectors 5 and 6 are provided are provided at or near each of the four corners of the solar collector. The two connectors 5 and 6 of each corner extend perpendicular to each other.

In the illustrated embodiment (FIGS. 1 and 2), a collection tube or manifold 7 for the heat-transfer medium is provided at each of the two longitudinal ends of the elongated rectangular solar collector. Each end of the manifold 7 has a transversely projecting connector 5 forming in effect an extension of the respective manifold 7. Furthermore, each end of the transversely extending manifold 7 has an additional connector 6 that extends longitudinally from it, perpendicular to the respective connector 5.

In the illustrated embodiment (see FIG. 2 in particular), the connectors 5 which form the transverse extension of the manifold 7 have larger diameters than the longitudinally extending connectors 6. An input line 12 for the heat-transfer medium may be connected to at least one connector 5 and 6, and an output line 13 for the heat-transfer medium may be connected to at least one additional connector 5 and 6. Unneeded connectors 5 and 6 may by closed in particular by a blind plug 8.

Preferably and in the illustrated embodiment, between the top-side absorber surface 1 and the bottom-side absorber surface 2 there are a plurality of distributed connecting points 9, preferably distributed in a uniform array over the absorber surfaces 1 and 2. In the region of the connecting points 9 the top-side absorber surface 1 and the bottom-side absorber surface 2 are arched toward the inside of the flow passage 4. The connecting points 9 thus form, in a manner of speaking, flow baffles in the flow passage 4 between the absorber surfaces 1 and 2. Otherwise, the heat-transfer medium preferably flows over the entire surface of the flow passage 4.

The solar collector according to the invention is preferably made of plastic, and is advantageously manufactured in a blow-molding process. As a result of this manufacture, in the illustrated embodiment (FIG. 1) initially only two connectors 6 have an open design, that is are formed tubular, and the remainder of the connectors 5 and 6 are closed by unitarily formed caps 14 that may be cut off when they are used. These closed connectors 5 and 6 may be easily opened by removing their ends, if necessary.

Figure 2:
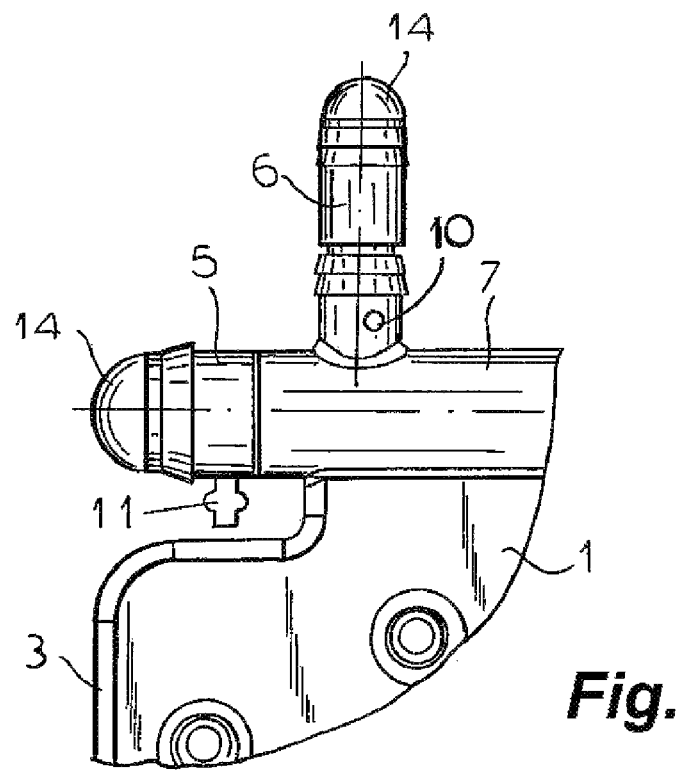
FIG. 2 is a large-scale view of the detail indicated at II in FIG. 1.
Figure 3:
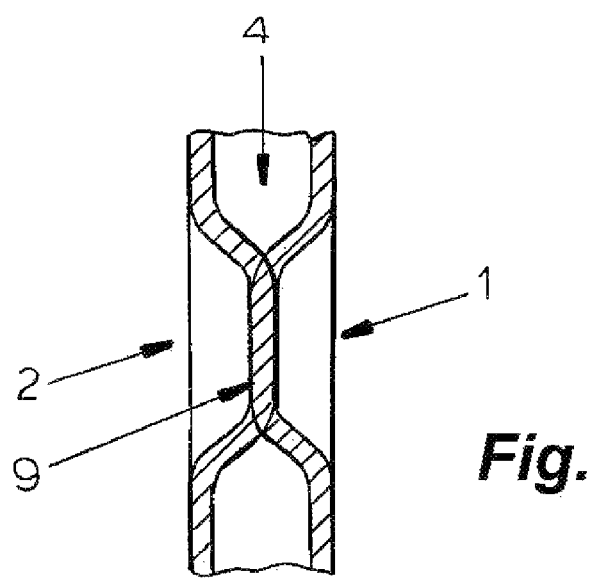
FIG. 3 is a large-scale cross section through a detail of FIG. 1.

FIG. 2 shows that one of the connectors 6 may be provided with a temperature sensor 10, and one of the connectors 5 with an openable vent valve 11.

We claim:

1. A solar collector comprising a single piece of plastic formed of one unitary piece with:
   a polygonal blow-molded top panel forming a top face and having at least three edges;
   a similarly polygonal blow-molded bottom panel unitarily formed with the top panel, forming a bottom face spaced from the top face, and fitted congruently to the top panel at the edges to form a single flow passage extending between the faces and within the edges, the flow passage being of the same area as at least one of the panels;
   an array of spaced connecting points unitarily formed on at least one of the panels and extending cross the flow passage into engagement with the other of the panels and each forming a flow-deflecting baffle; and
   at least four blow-molded connectors unitarily formed with and projecting from at least three of the edges and each unitarily formed with a removable end closure, the panels and edges being so configured that a heat-transfer fluid introduced into one of the connectors and drawn out through another of the connectors flows over the entire surface of the flow passage.

2. The solar collector defined in claim 1 wherein the panels are rectangular and have parallel longitudinal edges and parallel transverse edges extending crosswise between the longitudinal edges.

3. The solar collector defined in claim 2 wherein each of the edges has two of the connectors.

4. The solar collector defined in claim 3 wherein the edges meet at corners each provided with two of the connectors.

5. The solar collector defined in claim 4 wherein one of the connectors at each corner extends transversely and the other of the connectors at each corners extends longitudinally.

6. The solar collector defined in claim 1, further comprising
   means connected to one of the connectors for feeding the heat-transfer fluid into the one of the connectors,
   means connected to another of the connectors for passing the heat-transfer fluid through the passage to the other of the connectors and for drawing the heat-transfer fluid out of the other of the connectors.

7. The solar collector defined in claim 1, further comprising a vent on one of the connectors.

8. The solar collector defined in claim 1, further comprising a temperature sensor on one of the connectors.

9. The solar collector defined in claim 1 wherein the panels have bumps that project oppositely to the respective faces, the bumps meeting centrally in the passage and forming baffles therein.

10. The solar collector defined in claim 9 wherein the bumps are generally circular bumps in a uniform array.

11. The solar collector defined in claim 10 wherein each of panels is formed with such an array of bumps.

12. The solar collector defined in claim 11 wherein the bumps of each panel engage the bumps of the other panel.

\* \* \* \* \*